(12) United States Patent
Gerlach et al.

(10) Patent No.: US 7,913,377 B2
(45) Date of Patent: Mar. 29, 2011

(54) METHOD FOR PRODUCING A CERAMIC FILTER ELEMENT

(75) Inventors: Karin Gerlach, Moeglingen (DE); Stefan Tudyka, Ludwigsburg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 72 days.

(21) Appl. No.: 11/651,544

(22) Filed: Jan. 10, 2007

(65) Prior Publication Data

US 2007/0186911 A1    Aug. 16, 2007

Related U.S. Application Data

(63) Continuation of application No. PCT/EP2005/052884, filed on Jun. 21, 2005.

(30) Foreign Application Priority Data

Jul. 10, 2004  (DE) .................... 10 2004 033 494

(51) Int. Cl.
*H05B 3/00*  (2006.01)

(52) U.S. Cl. ........ 29/611; 29/890; 29/896.6; 29/896.62; 156/89.22; 156/253

(58) Field of Classification Search ............... 29/611, 29/890, 896.6, 896.62; 55/282, 498, 521, 55/523, 524; 156/89.22, 253
See application file for complete search history.

(56) References Cited

U.S. PATENT DOCUMENTS

| | | | | |
|---|---|---|---|---|
| 4,293,357 A | * | 10/1981 | Higuchi et al. | 156/89.22 |
| 4,652,286 A | * | 3/1987 | Kusuda et al. | 55/523 |
| 5,194,414 A | * | 3/1993 | Kuma | 502/80 |

FOREIGN PATENT DOCUMENTS

JP       63-134020 A    6/1988

* cited by examiner

*Primary Examiner* — Thiem Phan

(57) ABSTRACT

A method of producing a ceramic filter element suitable for use in an exhaust filter for an internal combustion engine, during which a combustible, non-ceramic support web is impregnated with a ceramic slip and formed into a desired geometric shape in either order, and then the impregnated and formed web is fired until the support web is burned out and a rigid ceramic filter body is formed.

17 Claims, 1 Drawing Sheet

METHOD FOR PRODUCING A CERAMIC FILTER ELEMENT

CROSS REFERENCE TO RELATED APPLICATIONS

This application is a continuation of international patent application no. PCT/EP2005/052884, filed Jun. 21, 2005, designating the United States of America, and published in German on Jan. 19, 2006 as WO 2006/005668, the entire disclosure of which is incorporated herein by reference. Priority is claimed based on Federal Republic of Germany patent application no. DE 10 205 403 34 94.3, filed Jul. 10, 2004.

BACKGROUND OF THE INVENTION

The invention relates to a method for manufacturing a ceramic filter element which may be used, for example, as an exhaust filter for an internal combustion engine.

Published Japanese patent application no. JP 63134020 A describes a ceramic filter element for an exhaust filter in an internal combustion engine that is constructed from a corrugated, spirally wound filter sheet. To manufacture the filter sheet, heat-resistant inorganic fibers in an aqueous suspension are mixed with ceramic powder and processed into a sheet. Several superimposed sheets are rolled into the desired shape of the filter body, so that honeycomb flow paths are formed between adjacent filter sheets. The filter body is subsequently fired at a high temperature.

A disadvantage in this manufacturing process is that it is relatively costly. In a first process step, a filter sheet must first be produced from the suspension of heat resistant inorganic fibers and the raw ceramic powder. This filter sheet must then be processed into the desired filter shape in a second process step and finally fired in a third process step. A further disadvantage is that the inorganic fibers in the finished filter body can reduce the filtering efficiency.

SUMMARY OF THE INVENTION

An object of the invention is to provide an improved method of manufacturing a ceramic filter element.

Another object of the invention is to provide a method of manufacturing ceramic filter element suitable for use in an exhaust filter for internal combustion engines.

A further object of the invention is to provide method of manufacturing a ceramic filter, which is simple to carry out and yields filter bodies distinguished by excellent filtering characteristics.

It is also an object of the invention to provide a method of manufacturing a filter element which produces a highly stable and heat resistant ceramic filter body.

An additional object of the invention is to provide a method of manufacturing a ceramic filter element which is readily adaptable to produce filter bodies having different geometries.

These and other objects are achieved in accordance with the present invention by providing a method for manufacturing a ceramic filter element, said method comprising impregnating a combustible, non-ceramic substrate sheet with a ceramic slip and forming the substrate sheet to a desired geometric shape, wherein the impregnation and forming may be performed in either order; and firing the impregnated and formed sheet until the substrate sheet is burned and a rigid ceramic filter body is formed. Advantageous further refinements are described hereinafter.

In the method according to the invention for manufacturing a ceramic filter element in an exhaust filter for internal combustion engines, a combustible non-ceramic substrate sheet is saturated with a ceramic slip in a first manufacturing step. Either an organic or an inorganic material may be used for this non-ceramic substrate sheet. A substrate sheet made of paper is particularly advantageous.

In a subsequent second manufacturing step, the substrate sheet saturated with the ceramic slip and shaped into the desired geometric form is fired until the material of the substrate sheet has burned out and a rigid filter body has formed. Since the ceramic slip saturates the substrate sheet completely, a full duplicate of the geometric structure of the substrate sheet consisting of the ceramic material is preserved after the substrate sheet material has been burned out.

This method is characterized, on the one hand, in that it basically requires only two process steps to produce the ceramic filter element. On the other hand, the use of the substrate sheet is advantageous because the substrate sheet can already be given the desired geometric structure, e.g. it can be fluted or corrugated, to create flow paths for the exhaust gas, so that additional shaping after introducing the ceramic slip can be dispensed with. Finally, it is also advantageous that the filter body retains its geometric shape after saturation with the ceramic slip, so that the desired geometric shape of the filter body is achieved or preserved after curing or firing and no finishing is required. Furthermore, the filtering efficiency is improved because it is sufficient in principle that the filter body consists only of a ceramic material and contains no additional substances that could affect filtering efficiency.

The filter elements produced in this manner are used, in particular, as diesel particulate filters and catalyst carriers.

In one advantageous further embodiment, a catalytic substance is introduced into the ceramic slip, so that the infiltration of the substrate sheet with the ceramic slip and the introduction of the catalytic substance can be performed in a single step.

To give the substrate sheet the stability required to prevent an undesired deformation during infiltration with the ceramic slip it may be useful to provide the substrate sheet with a supporting body, e.g., to apply a support grid to the substrate sheet. This support element can also be made of a combustible material, which burns when the entire filter body is fired. It is also possible, however, to form the support body of a ceramic material that remains in the finished element after completion and takes part in the filtration process. Finally, it is also possible to configure the supporting body as a heating element, e.g., in the form of heating wires, which remain in the filter body even after firing and can be heated for periodic thermal regeneration of the filter.

To create a filter body with a honeycomb structure in cross section, in which flow paths for the exhaust gas to be cleaned are formed in axial direction of the filter body, two superimposed substrate sheets may be bonded together, with at least one of the two substrate sheets being fluted or corrugated to form said flow paths. The superimposed substrate sheets are preferably bonded before being saturated with the ceramic slip. Two superimposed substrate sheets can be rolled into an approximately cylindrical filter body to form a wraparound filter. To close the flow paths at one end face, which is required for the exhaust gas to flow radially through the filter body, a ceramic adhesive is advantageously applied between the superimposed substrate sheets in the area of the one end face of the flow paths. The ceramic adhesive fully cures during firing and remains in the end face portion of the flow paths in the form of plugs.

To keep the shape of the superimposed substrate sheets prior to firing, it can be advantageous to bond them together by means of an adhesive, which during curing is burned with almost no residue. A suitable adhesive is, for example, a polymer adhesive.

In a further advantageous embodiment, the pore size of the filter body is modified after curing by applying a film using a sol-gel technology, for example, in which a sol in the form of a varnish is conventionally applied to the surface by means of, e.g., dip-coating, spray-coating or spin-coating, and a gel film is formed. In a subsequent process this gel film is then sintered or cured to form a ceramic film.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
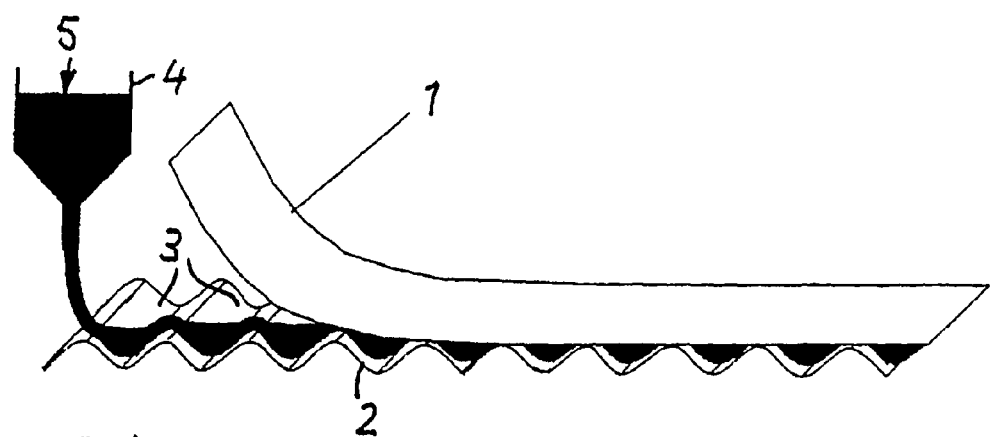
FIG. 1 shows two substrate sheets infiltrated with a ceramic slip and bonded to each other by an adhesive or a sealant, so that flow paths between the substrate sheets are sealed at one end.

As illustrated in FIG. 1, to produce a filter element intended for use in an exhaust gas filter for internal combustion engines, two substrate sheets 1 and 2 are superimposed on each other and bonded together by means of a ceramic adhesive 5. The substrate sheets 1 and 2 are paper sheets and are made of cellulose, but other organic or inorganic combustible substances may also be considered. The lower substrate sheet 2 is corrugated to create parallel extending flow paths 3. The upper substrate sheet is smooth. The two substrate sheets are bonded together by means of an adhesive 5 delivered from a hopper 4 and introduced in the region of one end face of the flow paths 3. In addition to bonding the two substrate sheets together, the adhesive has the function of closing the flow paths 3 at one end.

The use of a ceramic adhesive has the advantage that it is preserved even after subsequent firing, so that the flow paths remain securely closed. If only the two substrate sheets 1 and 2 are to be bonded together, without the additional function of closing the flow paths at one end, one can also consider a combustible adhesive, such as a polymer adhesive, which has only the function of fixing the relative position between the two substrate sheets and is completely burned after firing.

Figure 2:
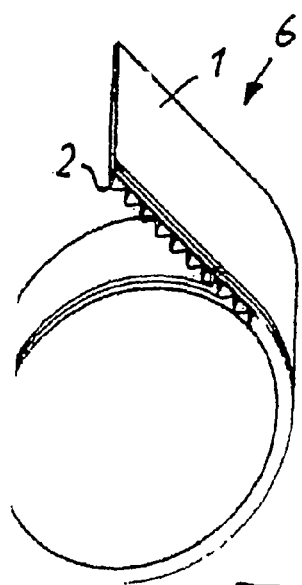
FIG. 2 is a perspective view of a spirally wound filter element rolled into a cylindrical body consisting of the two substrate sheets bonded as illustrated in FIG. 1.

As illustrated in FIG. 2, the two substrate sheets 1 and 2 are spirally wound to obtain their final form. This is advantageously done even before infiltration with the ceramic slip and subsequent curing and firing. If necessary, however, it is also possible first to saturate the two bonded substrate sheets with the ceramic slip and only then to roll them into the final shape of the filter element and subsequently cure and fire them.

Figure 3:
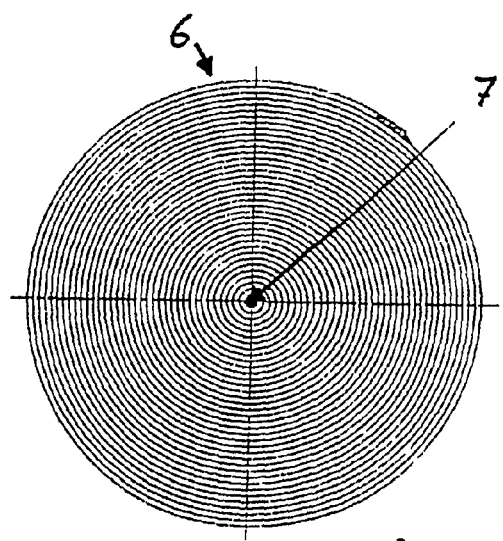
FIG. 3 is a view of an axial end face of a filter element produced in accordance with the invention.

It may also be advantageous to encapsulate the start of the winding 7 in the center with a sealant or an adhesive to enhance the stability of the wound filter element, as illustrated in FIG. 3.

Aluminum oxide, cordierite, mullite or silicon carbide is suitable as the ceramic material in the slip. In another advantageous embodiment, heating elements, e.g. heating wires, are introduced into the filter element 6 so that the filter element can be heated to periodically regenerate the filter.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method for manufacturing a ceramic filter element, said method comprising:
   forming a combustible, non-ceramic, non-impregnated substrate sheet to a desired geometric shape; thereafter
   rolling said sheet to form an axial flow wraparound body having axial flow channels;
   thereafter impregnating the formed sheet with a ceramic slip; and thereafter
   firing the impregnated and formed sheet until the substrate sheet is removed by burning out and a rigid ceramic filter body is formed, said substrate sheet removed from said filter body by combustion;
   wherein said desired geometric shape is preserved during the impregnating and subsequent firing.

2. The method according to claim 1, wherein the ceramic slip comprises a catalytic substance.

3. The method according to claim 1, wherein the substrate sheet is comprised of an organic material.

4. The method according to claim 3, wherein said organic material comprises cellulose.

5. The method according to claim 1, wherein the substrate sheet is comprised of a synthetic material.

6. The method according to claim 1, wherein the substrate sheet is supported by a support body.

7. The method according to claim 1, wherein two superimposed substrate sheets are bonded together, and at least one substrate sheet is pre-shaped in such a way that flow paths are formed.

8. The method according to claim 7, wherein the superimposed substrate sheets are bonded by a polymer adhesive.

9. The method according to claim 7, wherein the flow paths are closed by applying a ceramic adhesive.

10. The method according to claim 1, wherein the substrate sheet is connected to an electrically conductive heating element.

11. The method according to claim 1, wherein said slip comprises at least one ceramic material selected from the group consisting of aluminum oxide, cordierite, mullite and silicon carbide.

12. The method according to claim 1, further comprising modifying the pore size of the filter body after curing by applying a film to the filter body.

13. The method according to claim 12, wherein said film is applied by a sol-gel technique.

14. The method according to claim 1, wherein said filter is an exhaust gas filter for an internal combustion engine.

15. The method according to claim 1, wherein the substrate sheet is impregnated to saturation.

16. The method according to claim 1, wherein
    in the forming step, the non-ceramic, non-impregnated substrate sheet is a cellulose paper substrate sheet.

17. The method according to claim 16, wherein
    in the forming step, the cellulose substrate sheet does not comprise carbon fibers or carbon particle impregnation.

* * * * *